United States Patent
Lee et al.

(10) Patent No.: US 6,202,174 B1
(45) Date of Patent: Mar. 13, 2001

(54) METHOD FOR IDENTIFYING AND CORRECTING ERRORS IN A CENTRAL PROCESSING UNIT

(76) Inventors: Sherman Lee, 28531 Cedarbluff Dr., Rancho Palos Verdes, CA (US) 90274; David G. Kyle, 3107 Barton Point Cir., Austin, TX (US) 78733

( * ) Notice: Subject to any disclaimer, the term of this patent is extended or adjusted under 35 U.S.C. 154(b) by 0 days.

(21) Appl. No.: 08/710,336

(22) Filed: Sep. 16, 1996

(51) Int. Cl.[7] .................................................. G06F 11/00

(52) U.S. Cl. ............................ 714/38; 714/47; 714/704; 710/266

(58) Field of Search ......................... 395/183.14, 183.13, 395/183.15, 184.01, 185.01, 704, 708, 733, 734, 739; 364/267, 267.91, 737; 714/38, 37, 39, 47, 48

(56) References Cited

U.S. PATENT DOCUMENTS

| | | | |
|---|---|---|---|
| 3,905,023 | * 9/1975 | Perpiglia | 395/182.04 |
| 4,410,938 | * 10/1983 | Higashiyama | 395/184.01 |
| 4,412,285 | * 10/1983 | Neches et al. | 395/200.82 |
| 4,792,955 | 12/1988 | Johnson et al. | 371/68 |
| 4,819,234 | * 4/1989 | Huber | 395/183.14 |
| 4,982,402 | * 1/1991 | Beaven et al. | 395/182.13 |
| 5,119,377 | * 6/1992 | Cobb et al. | 395/183.14 |
| 5,125,087 | * 6/1992 | Randell | 395/568 |
| 5,214,652 | * 5/1993 | Sutton | 395/182.08 |
| 5,437,039 | 7/1995 | Yuen | 395/725 |
| 5,533,192 | * 7/1996 | Hawley et al. | 395/183.04 |

FOREIGN PATENT DOCUMENTS

442277A2 * of 1991 (EP) .

OTHER PUBLICATIONS

Allen, J.R., & Yau, S.S., "Real–time fault detection for small computers"; May/1972; pp. 119–127.*
"PowerPC 602 Aims for Comsumer Products", Linley Gwennap, Microprocessor Report, Feb. 16, 1995, pp. 16–18.
"Intel's P6 Uses Decoupled Superscalar Design", Linley Gwennap, Microprocessor Report, Feb. 16, 1995, pp. 9–15.
"New Algorithm Improves Branch Prediction", Linley Gwennap, Microprocessor Report, Mar. 27, 1995, pp. 17–21.

(List continued on next page.)

*Primary Examiner*—Dieu-Minh T. Le
(74) *Attorney, Agent, or Firm*—Skjerven, Morill, MacPherson, Franklin & Friel LLP; Omkar K. Suryadevara (57) ABSTRACT

A central processing unit (CPU) repeatedly interrupts execution of software to save the CPU state, i.e. contents of various storage elements internal to the CPU, until an error occurs during the execution. On occurrence of the error, the CPU once again saves state and only then passes control to a handler in the software for handling the error. The state saving steps can be implemented in a computer process by use of a timer interrupt or by use of system management, or ICE breakpoint instructions that are included in the x86 instruction set. Errors can be debugged off-line in a development system, for example, by use of an in-circuit emulator to load the saved CPU states sequentially into the development system, thereby to recreate the error condition. Errors can also be debugged proactively, even before the error occurs, by use of a number of known-to-be-erroneous instructions and corresponding fix instructions. For proactive debugging, the CPU compares instructions to be executed with each of the known-to-be-erroneous instructions, and on finding a match, injects the corresponding fix instructions into the to-be-executed instructions. Therefore, known errors e.g. the PENTIUM arithmetic bug are avoided, e.g. by replacing one arithmetic instruction with another arithmetic instruction. Moreover, if an error has not yet been debugged, a temporary fix instruction can be used to gracefully terminate an application.

11 Claims, 5 Drawing Sheets

OTHER PUBLICATIONS

"The Dr. Watson Diagnostic Tool", Technical Articles: Windows: Development Environment—Microsoft Development Library, pp. 1–7, May 1994.

"An Annotated Dr. Watson Log File", KB:Windows SDK KBase—Microsoft Development Library, PSS ID No.: Q81142, Jun. 1995, pp. 1–4.

"WW0440: The DrWatson and MSD Diagnostics", KB:Windows 3.x KBase—Microsoft Development Library, PSS ID No.: Q75020, Jul. 1995, pp. 1–7.

Wolfe, Alexander, "Intel equips its P6 with test and debug features", Electronic Engineering Times Oct. 16, 1995 n870 p1(2), Computer Select, Dec. 1995, pp. 1–3.

Graham, Andrew J., "Profiting from standards", Electronic Engineering Times Oct. 23, 1995 n871 p24(2), Computer Select, Dec. 1995, pp. 1–3.

Daniel, Wayne, "Test bus takes a ride on popular PCI", Electronic Engineering Times Oct. 16, 1995 n870 p55(1), Computer Select, Dec. 1995, pp. 1–3.

Hlavaty, Joseph, "Exception Handlers and Windows Applications", Dr. Dobb's Journal on CD–ROM, Sep. 1994, pp. 1–15.

Pietrek, Matt, "Postmortem Debugging", Dr. Dobb's Journal on CD–ROM, Sep. 1992, pp. 1–12.

"Nx686 Goes Toe–to–Toe With Pentium Pro", Linley Gwennap, Microprocessor Report, Oct. 23, 1995, pp. 6–10.

"Hal Reveals Multichip SPARC Processor", Linley Gwennap, Microprocessor Report, Mar. 6, 1995, pp. 6–11.

"Computer Organization and Design", John L. Hennessy, etc., Morgan Kaufmann Publishers, Chapter 7, pp. 502–504.

"Intel Equips Its P6 With Test and Debug Features", Alexander Wolfe, Electronic Engineering Times, Oct. 16, 1995, pp. 1, 106.

"P6 Stirs Up Software Issues", Alexander Wolfe, Electronic Engineering Times, Oct. 30, 1995, p.22.

"Intel's Potent P6 Premiers", Alexander Wolfe, Electronic Engineering Times, Oct. 30, 1995, pp. 1, 22, 24.

Pentium™ Processor User's Manual, vol. 1, Chapter 3, Intel, 1993, pp. 3–1 to 3–25.

The Complete X86, John Wharton, vol. II, Chapter 20, 1994, pp. 639–679.

* cited by examiner

METHOD FOR IDENTIFYING AND CORRECTING ERRORS IN A CENTRAL PROCESSING UNIT

CROSS-REFERENCE TO RELATED APPLICATIONS

This application is related to and incorporates by reference herein in their entirety the following commonly owned, concurrently filed, copending U.S. Patent Applications:

1. "A Port For Fine Tuning A Central Processing Unit" by Sherman Lee and David G. Kyle, Ser. No. 08/710,337, now U.S. Pat. No. 5,937,203, issued on Aug. 10, 1999.

2. "A Method For Fine Tuning Operation of Circuitry In A Central Processing Unit" by Sherman Lee and David G. Kyle, Ser. No. 08/710,294, now U.S. Pat. No. 5,812,425, issued on Sep. 22, 1998.

FIELD OF THE INVENTION

This invention relates to a method for identifying errors in a programmed digital computer and for correcting the identified errors. In particular, this invention relates to a method for monitoring instructions and data that cause errors, analyzing the monitored instructions and data to predict errors and for preventing future errors from occurring, for example by inserting corrective software.

BACKGROUND OF THE INVENTION

MICROSOFT Corporation's Dr. Watson is a debugging tool that logs information regarding internal operations of the operating system "WINDOWS" into a failure report. Dr. Watson logs the information after any application software (typically called just "application") encounters an error, that MICROSOFT calls "unrecoverable application error (UAE)." See, for example, "An Annotated Dr. Watson Log File," KB:Windows SDK KBase, Microsoft Development Library, MICROSOFT Corporation, One Microsoft Way, Redmond, Wash.; "Postmortem Debugging," Matt Pietrek, Dr. Dobb's Journal, September 1992; and "Exception Handlers and Windows Applications," Joseph Hlavaty, Dr. Dobbs Journal, September 1994; all of which are incorporated by reference herein in their entirety.

Briefly, a Dr. Watson failure report contains information on (1) the name of an application that failed, (2) the error encountered, such as "Exceed Segment Bounds (Read)," (3) the instruction's address at which the failure occurred, (4) the instruction that caused the failure, (5) the contents in various registers, such as CPU registers, instruction pointer (also called "program counter"), stack pointer, base pointer, code segment selector, stack segment selector, data segment selector, extra segment selector, 32-bit registers and flag bits (e.g. Overflow bit, Direction bit, Sign bit, Zero bit, Carry bit, Interrupt bit, Auxcarry bit and Parity bit), (6) WINDOWS installation and environment information, (7) stack frame information such as disassembled instructions surrounding the failed instruction, and several levels of nested function calls leading to the failed instruction, (8) names of all tasks when the failure occurred and (9) user response typed into a "Dr. Watson's Clues" dialog box.

MICROSOFT Corporation recommends that a user exit WINDOWS after a UAE occurs, and if exiting is not possible, to restart the personal computer. See "The DrWatson and MSD Diagnostics," KB:Windows 3.x KBase, Microsoft Development Library, MICROSOFT Corporation, One Microsoft Way, Redmond, Wash., also incorporated by reference herein in its entirety. MICROSOFT Corporation further recommends that after a UAE occurs, the user should run MICROSOFT DIAGNOSTICS (MSD) that identifies system configuration information, such as the BIOS, video card type, manufacturer, installed processor(s), I/O port status, operating system version, environment settings, hardware devices attached, and additional software running concurrently with MSD. Id. All of these actions can result in loss of valuable data, as well as valuable time before a user can continue using the application.

MICROSOFT Corporation also recommends that after logging several UAEs, the user should send the log to MICROSOFT Corporation, although MICROSOFT Corporation cannot respond to log contributors. Id. Therefore, the user receives no assistance in identifying the problem that caused the UAE and in fixing the application to avoid that particular UAE in future. Moreover, Dr. Watson appears to log only an application's UAEs failures, and cannot be used for debugging other errors, such as errors in the operating system or errors in hardware.

Errors in hardware can be debugged using a built-in "debug" port of the type present in INTEL's P6 (also called "Pentium Pro") microprocessor. INTEL recommends the P6's debug port as an aid for designing a system board on which the CPU is mounted. See, for example, "Intel equips its P6 with test and debug features," Electronic Engineering Times, Oct. 16, 1995, n870, pages 1-2, that is incorporated by reference herein in its entirety.

Briefly, the P6 debug port is typically connected to an "in-target probe" (ITP) via a 30-pin connector, and allows access to boundary-scan (JTAG) and built-in-self-test (BIST) structures on the P6 microprocessor. Through an ITP such as ICE-16 available from, for example, American Arium, Tustin, Calif., board designers can control program execution, set break points, monitor the P6's access of registers, memory and input-output devices.

However, a typical user neither has access to an ITP nor the expertise needed to use the ITP. Therefore, the user is still unable to identify the problem that causes a UAE and unable to fix the application to avoid known UAEs in future.

SUMMARY

In accordance with the invention, a central processing unit (CPU) repeatedly interrupts execution of software to save the CPU state, i.e. contents of various storage elements internal to the CPU, until an error occurs during the execution. On occurrence of the error, the CPU once again saves state and only then passes control to a handler in the software for handling the error. Each time the CPU state is saved at locations in memory different from the previous time so that a sequence of CPU states is saved when control passes to the handler. The storage elements whose contents are saved can be of two types: (1) accessible, and (2) inaccessible to the executing software, such as an operating system or an application. Moreover, the above-described state saving steps can be implemented, in different embodiments of the invention, in hardware (e.g. as a state machine) or in software (e.g. in basic-input-output-system (BIOS), in an operating system, as a device driver, or as a utility). In one specific embodiment, the state saving steps are implemented in a computer process by use of x86 instructions.[1]

[1] The x86 instruction are instructions executable by microprocessors compatible with microprocessors in the 8086, 80286, 80386, 80486, Pentium and Pentium Pro (P6) families of microprocessors available from Intel Corporation, Santa Clara, Calif.

In one embodiment, errors are debugged off-line in a development system, for example, by use of an in-circuit emulator to load the saved CPU states sequentially into the development system, thereby to recreate the error condition. If the frequency of the saved CPU states is too coarse to find the source of the error, the CPU states can be saved more frequently, e.g. after shorter time periods, on every jump instruction, on every input-output instruction, on every function-call instruction, or on some combination these events, depending on one or more flags. The flags can be set, for example, in a configuration file that is checked at the startup of the computer process. The sequence of saved CPU states allows recreation of error conditions otherwise not possible in the prior art. Moreover, the CPU states are saved transparent to the software, thereby allowing recreation of errors in an operating system as well as errors from interaction between the operating system and an application, both of which were not possible in the prior art.

In accordance with the invention, an error can also be debugged proactively by a computer process, even before the error occurs, by use of a number of known-to-be-erroneous instructions and fix instructions corresponding to the known-to-be-erroneous instructions. In one embodiment, the CPU compares instructions to be executed with each of the known-to-be-erroneous instructions, and on finding a match, injects the corresponding fix instructions into the to-be-executed instructions. In this embodiment, these proactive error debugging steps are executed by the state saving process optionally depending on a flag that is set or cleared, for example, in a configuration file. In another embodiment, the proactive error debugging steps are implemented in a different process that executes independent of the state saving process, i.e. does not save CPU states.

Therefore, well known errors e.g. the 80286 jump bug or the PENTIUM arithmetic bug are easily avoided, e.g. by inserting a no-op instruction before a jump instruction or by replacing one arithmetic instruction with another arithmetic instruction. Such proactive debugging allows a user to continue to use, for example, a defective PENTIUM or defective software and not have any known errors. Moreover, if an error has not yet been debugged, the handler can add an erroneous instruction to the known-to-be-erroneous instructions with a corresponding temporary-fix instruction to gracefully terminate the application, e.g. if the erroneous instruction is known to crash (e.g. "freeze") the CPU. Such graceful termination of the application allows the CPU to continue execution of other software that may be of value to a user, e.g. to eliminate the need to reboot the operating system otherwise required in the prior art.

DETAILED DESCRIPTION

In accordance with the invention, a central processing unit (hereinafter "CPU") repeatedly interrupts execution of software to save the CPU state, i.e. contents of various storage elements internal to the CPU, until an error occurs during the execution. On occurrence of the error, the CPU once again saves state and only then passes control to a handler in the software for handling the error. The storage elements whose contents are saved can be of two types: (1) accessible, and (2) inaccessible to the executing software, such as an operating system or an application. The state saving steps can be implemented in a computer process by use of system management instructions that are included in the x86 instruction set. Errors can be debugged off-line in a development system, for example, by use of an in-circuit emulator to load the saved CPU states sequentially into the development system, thereby to recreate the error condition. Errors can also be debugged proactively, even before the error occurs, by use of a number of known-to-be-erroneous instructions and fix instructions corresponding to the known-to-be-erroneous instructions. Specifically, the CPU compares instructions to be executed with each of the known-to-be-erroneous instructions, and on finding a match, injects the corresponding fix instructions into the to-be-executed instructions. Therefore, known errors e.g. the PENTIUM arithmetic bug are avoided, e.g. by replacing one arithmetic instruction with another arithmetic instruction. Moreover, if an error has not yet been debugged, a temporary fix instruction can be used to gracefully terminate an application that would otherwise "freeze" the CPU.

In one embodiment, the above-described CPU is a "tunable CPU" having a number of tunable units, with each tunable unit having one or more parameters that can be changed, to thereby change circuitry in the CPU. Examples of circuitry in a tunable unit and a device (called "fine tuning port") for changing circuitry in the CPU are described in the above-incorporated application, Ser. No. 08/710,337 now U.S. Pat. No. 5,937,203, issued on Aug. 10, 1999.

In this embodiment, the above-described state saving steps are implemented in a computer process that fine tunes the tunable CPU. The computer process waits for a triggering event indicating the need for fine tuning of the tunable CPU, reads one or more statistics on performance of the tunable CPU, compares the read statistics with predetermined statistics patterns to determine one or more parameter signals, and drives the parameter signals to one or more tunable units, thereby to change the circuitry in the tunable CPU. Examples of steps for fine tuning the tunable CPU are described in the above-incorporated application, Ser. No. 08/710,294 now U.S. Pat. No. 5,812,425, issued on Sep. 22, 1998.

Although specific circuitry is described herein for a particular embodiment of the invention, other such embodiments will be obvious to a person skilled in the art of designing debugging systems for microprocessors in view of the disclosure. Accordingly, the embodiments described herein are merely illustrative and not limiting.

Figure 1A:
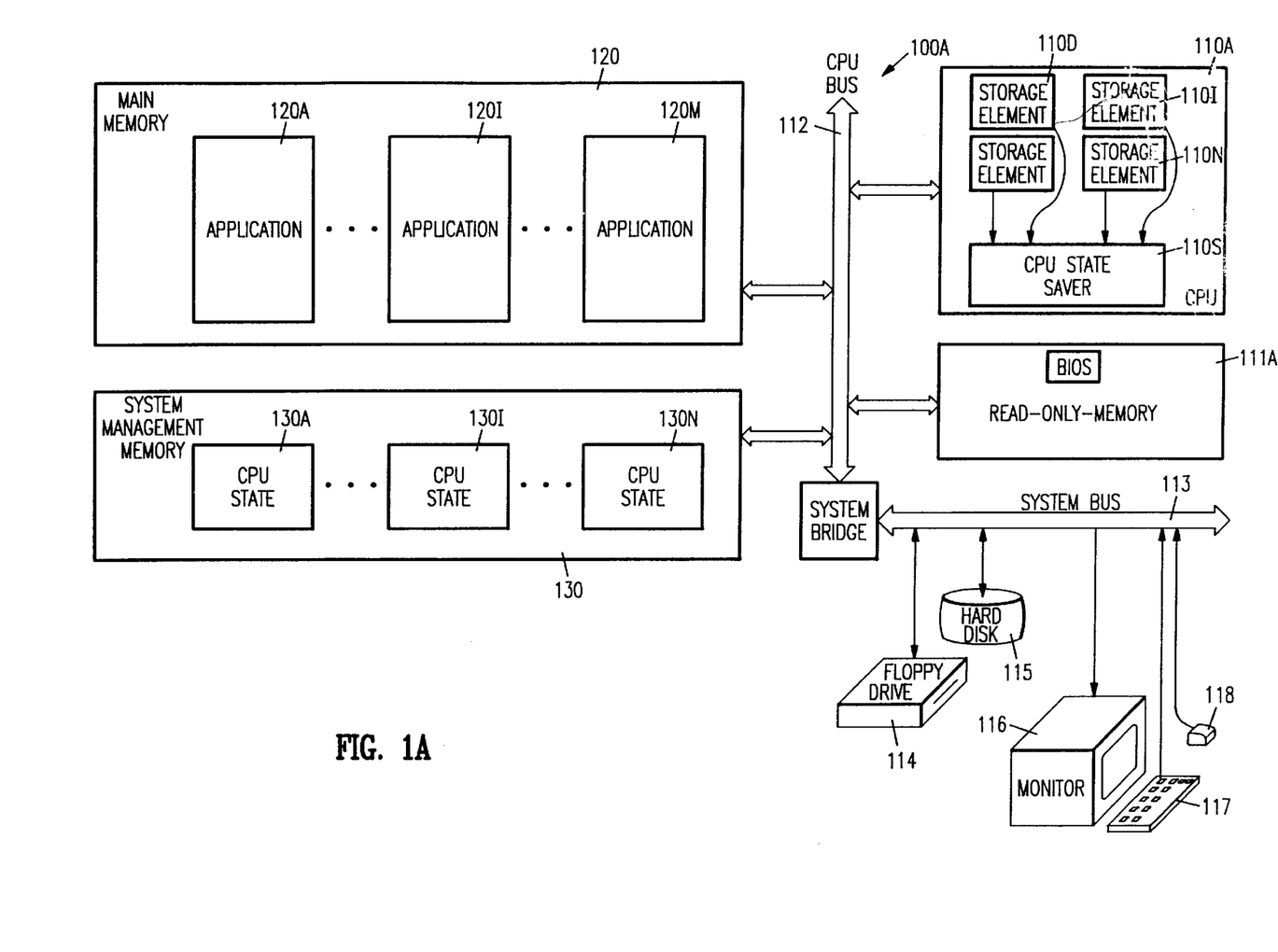
FIGS. 1A–1C each illustrate a central processing unit (CPU) circuitry tuner in three different embodiments of a computer system.

In one embodiment, a computer system 100A includes a CPU 110A having a built-in CPU state saver 110S. CPU state saver 110S repeatedly saves the state of CPU 110A, such as contents of storage elements 110D–110N as described more completely below. In addition to CPU 110A, computer system 100A includes a read only memory 111 that is encoded with basic input output system instructions for CPU 110A. Read only memory 111 and CPU 110A are coupled to each other by a CPU bus 112 that is also coupled via a system bridge (not labelled) to a system bus 113. System bus 113 in turn is coupled to a floppy drive 114, a hard disk 115, a monitor 116, a keyboard 117 and a mouse 118. CPU bus 112 is also coupled to a main memory 120 that is encoded with a number of applications, e.g. application 120A . . . 120I . . . 120M, where M is the number of applications.

Figure 3:
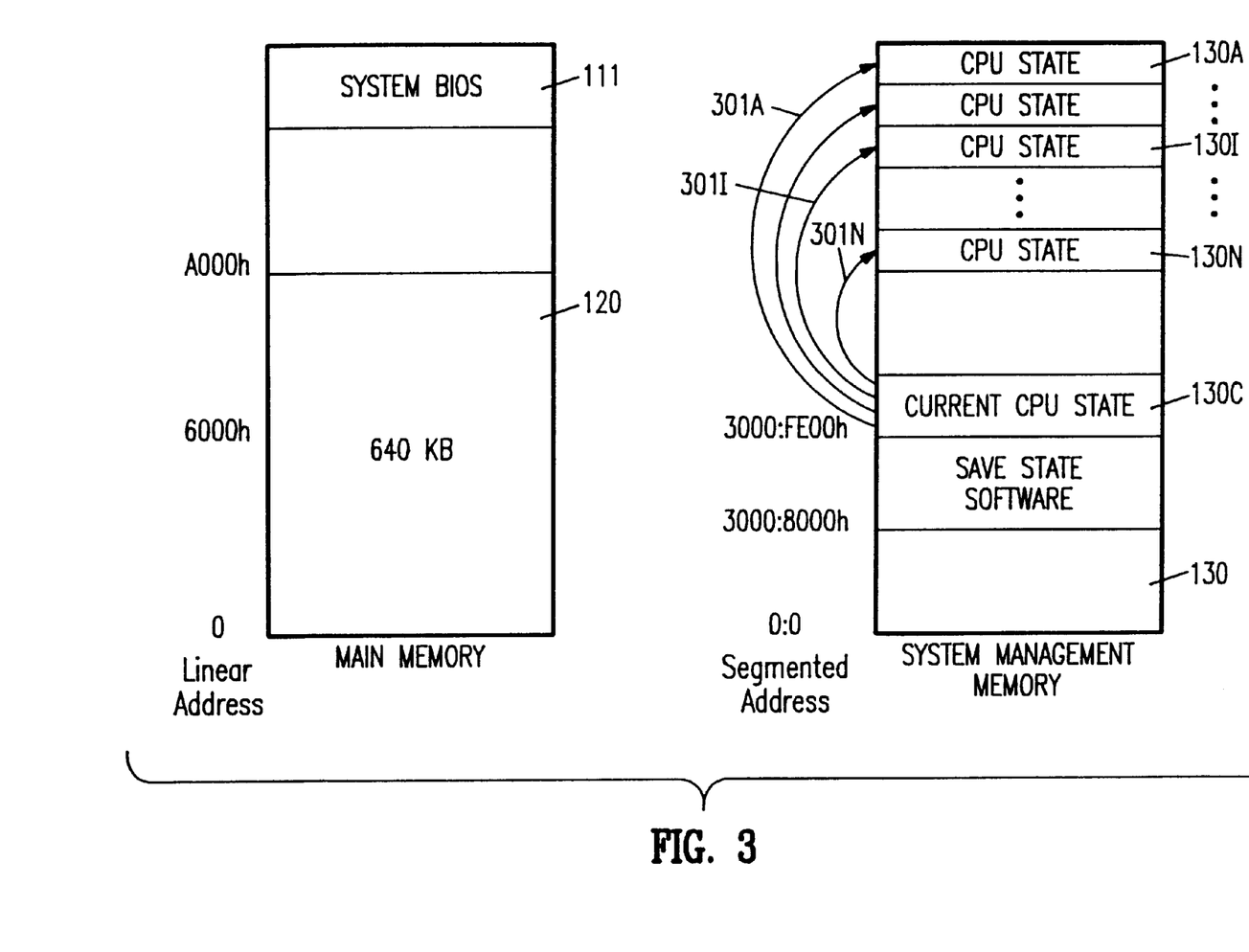
FIG. 3 illustrates addresses and contents of main memory 120 and system management memory 130 in one embodiment of the invention.

In addition to the above-described parts, computer system 100A also includes a system management memory 130 that is coupled via CPU bus 112 to CPU 110A, and that is accessible to CPU state saver 110S. System management memory 130 is typically "hidden" from i.e. made inaccessible from applications 120A–120M in the manner described in, for example, "The CPU and Undocumented Instructions," Chapter 3 of the book "The Undocumented PC" by Frank van Gilluwe, Addison-Wesley Publishing Company, Reading, Mass.; this book is incorporated by reference herein in its entirety. In this embodiment, system management memory 130 holds a number of CPU states e.g. CPU state 130A, . . . 130I, . . . 130N, where N is the number of CPU states. CPU states for one embodiment are described below in reference to FIG. 3.

Figure 1B:
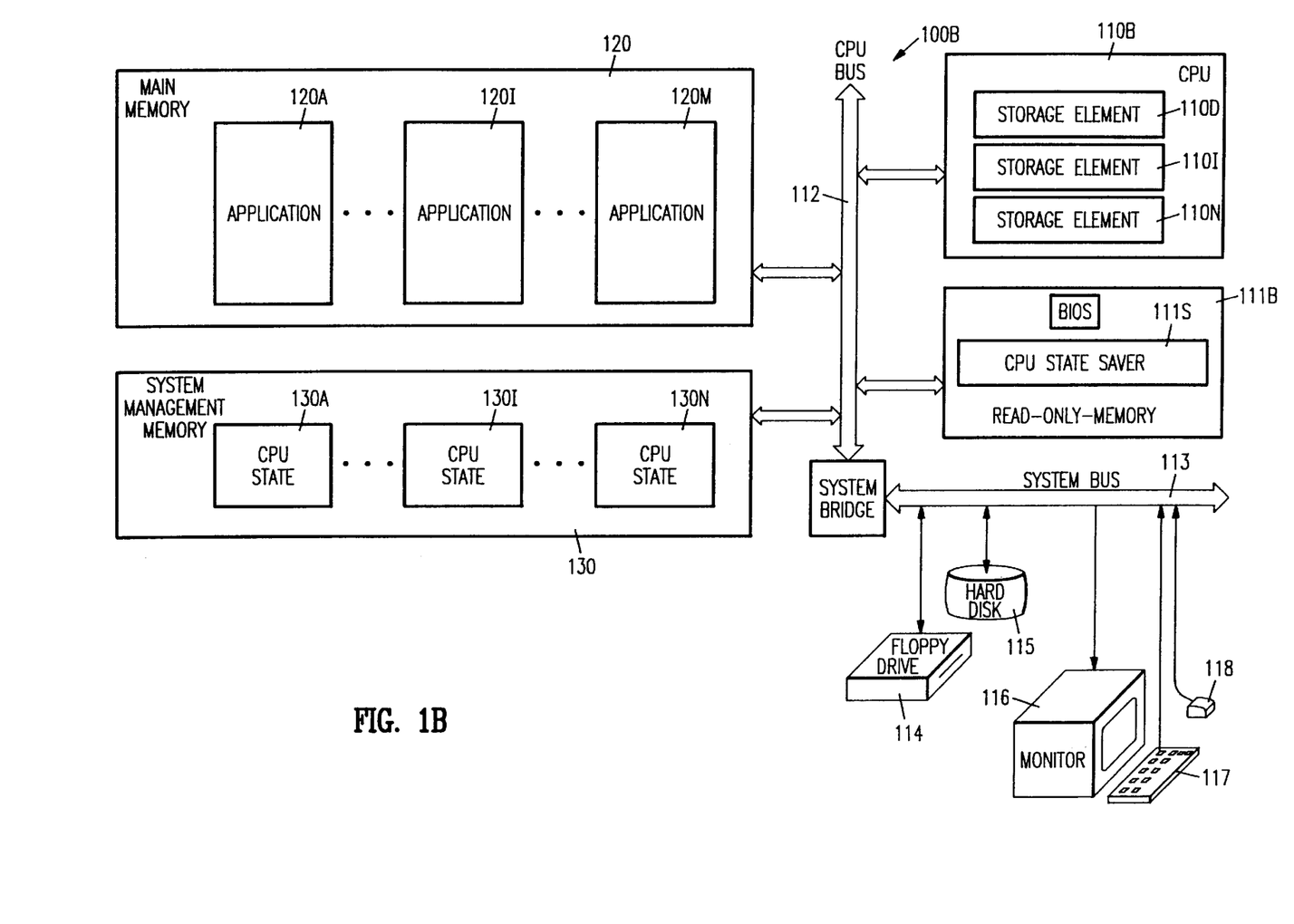
Figure 1C:
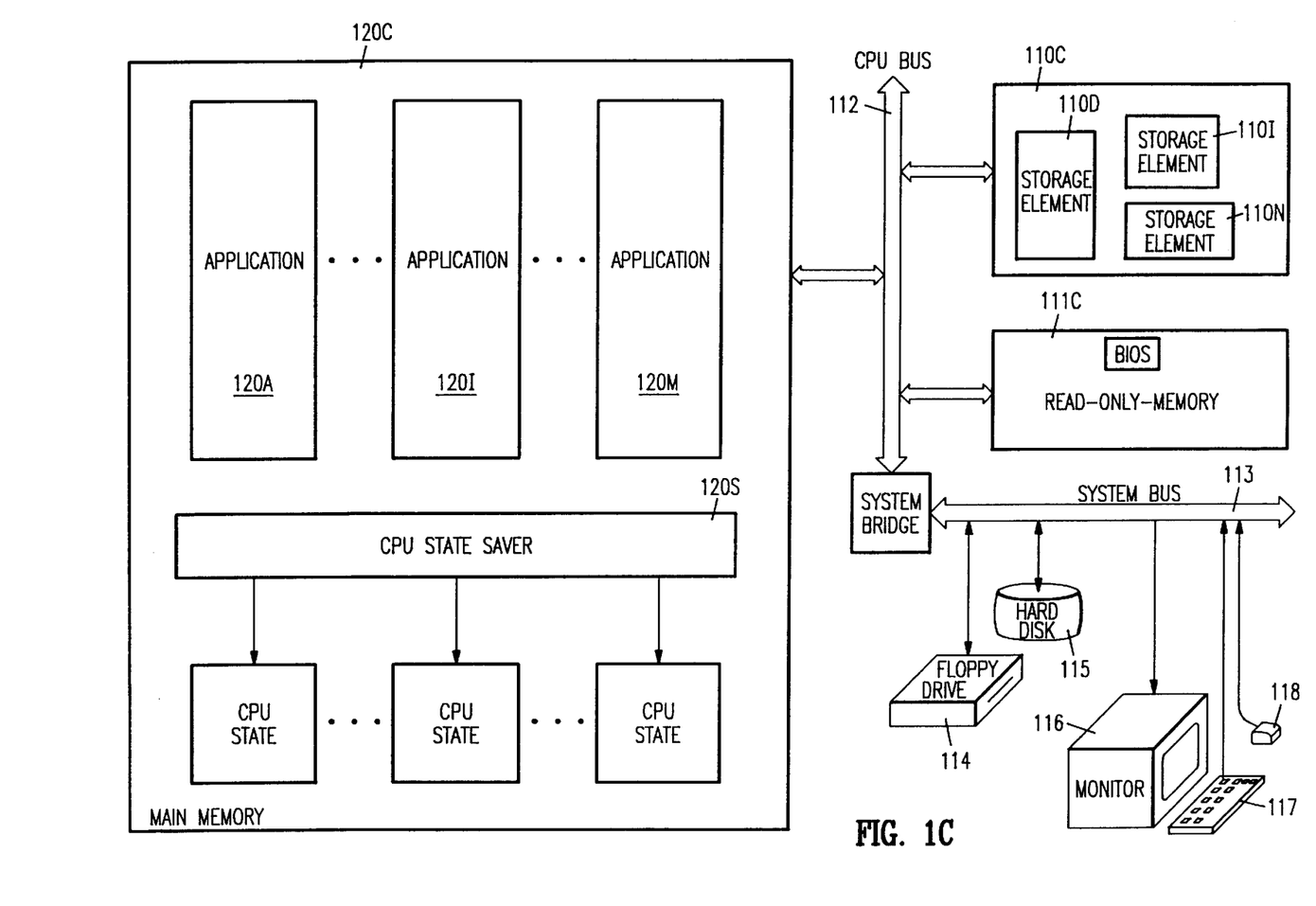
Figure 2:
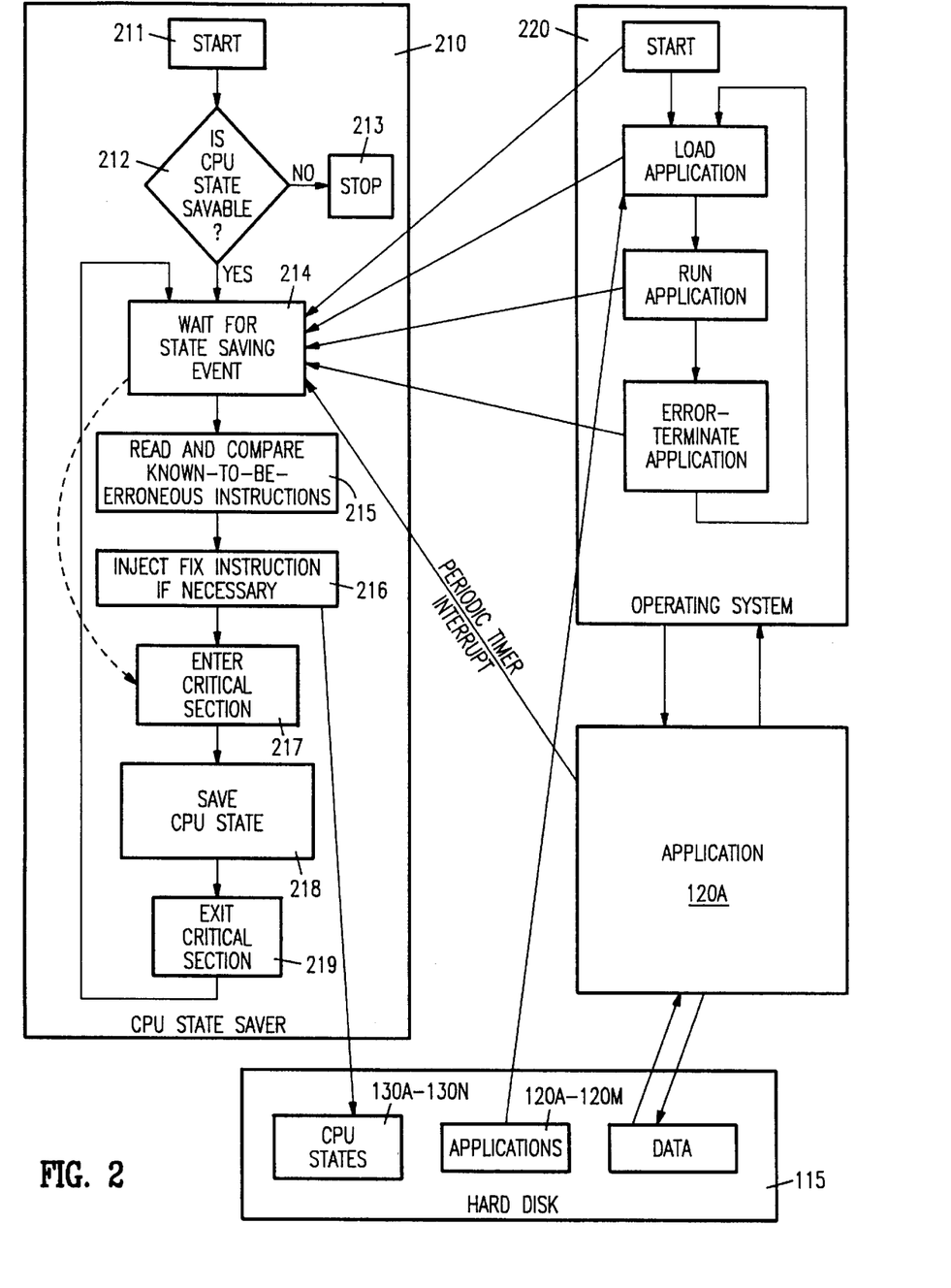
FIG. 2 illustrates, in a high level flowcharts and block diagrams, various steps performed by the CPU-circuitry tuner of FIGS. 1A–1C.

In this embodiment, CPU state saver 110S in CPU 110A is implemented in hardware as circuitry that performs a number of steps illustrated in FIG. 2 (described below). In an alternative embodiment, CPU state saver 110S is encoded as microcode resident in storage elements (not shown) in CPU 110A that also performs the steps of FIG. 2. In another embodiment, a CPU 110B (FIG. 1B) does not have the above-described CPU state saver 110S, but rather has a software version, CPU state saver 111S that is encoded in read only memory 111 in addition to the Basic Input Output System (BIOS) instructions. CPU state saver 111T also performs the steps described below in reference to FIG. 2. Note that the same reference numerals are used for various parts in FIGS. 1B and 1C that are similar or identical to the corresponding parts in FIG. 1A.

In yet another embodiment of the invention, both CPU 110C (FIG. 1C) and read only memory 111C do not have a CPU state saver 110S or 111s. Instead, a software version, CPU state saver 120S is encoded in main memory 120C. In addition, computer system 100C does not have system management memory 130, and rather CPU states 130A–130N are saved in main memory 120C. In this embodiment as well, CPU state saver 120T performs the steps described below in reference to FIG. 2.

A CPU state saver 210 in one embodiment of the invention initializes variables on start up in a step 211 and thereafter checks in step 212 whether the state of CPU 110A (FIG. 1A) can be saved, and if not stops in step 213. Step 212 can be implemented, for example, by determining the identity of CPU 110A and jumping to instructions specific to the determined identity for the following steps. The identity of CPU 110A can be determined, for example, as described in "System Equipment and Detection," Chapter 4 of the book "The Undocumented PC" incorporated by reference above.

If the CPU state is savable, CPU state saver 210 stores one of the CPU state 130A–130N into memory. Then CPU state saver 210 goes from step 212 to step 213 and waits for an event indicating the need for saving CPU state. The state saving event can be, for example, the loading and running of an application program by the operating system or a system interrupt that occurs periodically, e.g. every five second or 10 seconds during the running of an application. The CPU state can be saved more frequently, e.g. by having CPU state on every jump instruction, on every input-output instruction or on every function_call instruction, or some combination depending on flags in e.g. storage element 110D.

On occurrence of such an event, CPU state saver 210 goes to step 215 and analyzes (as described more completely below) the to-be-performed instructions. The CPU state is also saved on occurrence of an error-in which case CPU state saver 210 skips steps 215—215 (described below) and goes directly to step 217. Then, CPU state saver 210 goes to step 216 and injects one or more fix instructions as necessary. For example, a "no-op" instruction can be inserted before a jump instruction for the A0286 microprocessor. As another example, an arithmetic instruction to the PENTIUM can be replaced by a series of arithmetic instructions that work around the error.

Next, CPU state saver 210 enters a critical section in step 217, for example by disabling interrupts and serializing (e.g. making sequential) the execution of instructions in CPU 110A. During this step, if necessary, CPU state saver 210 also switches from main memory 120 to system management memory 130 that is inaccessible to applications 120A–120M.

After entering the critical section, CPU state saver 210 goes to step 218 and stores the CPU state in memory, such as system management memory 130 or main memory 120. Depending on the identity of CPU 110A, one of the save state instructions in Table 1 is used to save the CPU state.

TABLE 1

| CPU Identity | Save State Instruction | OpCode | Number of Bytes Saved | Address for Storing Current CPU State | Address for Save State Software |
|---|---|---|---|---|---|
| AMD 386SXLC | SMI | F1h | 228 | 6000:0h | FFFFFFF0h (reset) |
| AMD 386DXLC | SMI | F1h | 228 | 6000:0h | FFFFFFF0h (reset) |
| AMD 486DXLC | SMI | F1h | 364 | 6000:0h | FFFFFFF0h (reset) |
| IBM 386SLC | ICEBP | F1h | 284 | 6000:0h | FFFFFFF0h (reset) |
| IBM 486SLC | ICEBP | F1h | 284 | 6000:0h | FFFFFFF0h (reset) |
| Intel 386SL | Timer Interrupt from 82360SL | 0Fh, 30h; note: enable bit 5 in model specific register 1000h | 512 | 3000:FE00h | 3000:8000h |
| Intel 486SL | Timer Interrupt from 82360SL | 0Fh, 30h; note: enable bit 5 in model specific register 1000h | 512 | 3000:FE00h | 3000:8000h |

Similarly, a store instruction can also be used to store CPU state in memory. The data saved in a CPU state 130A is illustrated in Table 2 for an INTEL microprocessor (see pages 88–90 of the above-referenced book by Frank van Gilluwe for more details).

TABLE 2

| System Management Memory Offset | Total Word Stored | Data Stored in CPU State |
|---|---|---|
| FE00 | 124 | Unknown |
| FEF8 | 2 | State Dump Base-This holds the internal register value of the segment for the Suspend code and storage of this table. It defaults to 3000h. |
| FEFC | 1 | System Management Mode Bits bit 0 = 1 CPU supports I/O Trap restart bit 1 = 1 CPU supports |

TABLE 2-continued

| System Management Memory Offset | Total Word Stored | Data Stored in CPU State |
|---|---|---|
| | | state dump base changes |
| FFFE | 1 | System Management Mode Revision Number |
| FF00 | 1 | I/O Trap restart-Always set to zero when saved. |
| FF02 | 1 | Halt auto restart-This value is set to 1 if SMI occurred while the CPU was in a HALT instruction. Otherwise it is set to 0. |
| FF04 | 51 | Unknown |
| FFA8 | 1 | ES |
| FFAA | 1 | Unknown |
| FFAC | 1 | CS |
| FFAE | 1 | Unknown |
| FFB0 | 1 | SS |
| FFB2 | 1 | Unknown |
| FFB4 | 1 | DS |
| FFB6 | 1 | Unknown |
| FFB8 | 1 | FS |
| FFBA | 1 | Unknown |
| FFBC | 1 | GS |
| FFBE | 1 | Unknown |
| FFC0 | 1 | LDTR-Local Descriptor Table Register |
| FFC2 | 1 | Unknown |
| FFC4 | 1 | TR-Task Register |
| FFC6 | 1 | Unknown |
| FFC8 | 2 | DR7 |
| FFCC | 2 | DR6 |
| FFD0 | 2 | EAX |
| FFD4 | 2 | ECX |
| FFD8 | 2 | EDX |
| FFDC | 2 | EBX |
| FFE0 | 2 | ESP |
| FFE4 | 2 | EBP |
| FFE8 | 2 | ESI |
| FFEC | 2 | EDI |
| FFF0 | 2 | EIP |
| FFF4 | 2 | EFLAGS |
| FFF8 | 2 | CR0 |
| FFFC | 2 | CR1 |

In addition to the above-described contents of storage elements, in this embodiment, CPU state saver 210 also saves application-specific information, such as the name of an application, stack frame information, and operating system specific information, such as the names of all tasks running when the failure occurred and other information of the type saved by Dr. Watson as described above. CPU state saver 2 can also save the contents of a data cache as part of the CPU state. Alternatively, CPU saver 210 can save state on every input-output instruction, thereby to record data operands from as the operands and to CPU 110A. Therefore, the storage elements whose contents are saved are of two types: (1) accessible and (2) inaccessible to the executing software. In this particular embodiment, the CPU state is automatically stored at the memory location 3000: FE00h (FIG. 3) on execution of a save state instruction (Table 1). The current CPU state 130C saved at the address 3000: FE00h is then copied by CPU state saver 210 as shown by arrows 301A–301N to one of CPU states 130A–130N.

If CPU State Saver 210 executes step 218 due to an error, CPU state saver 210 copies all of CPU states 130A–130N to hard disk 115.

Thereafter, CPU state saver 210 goes to step 219 and exits from the critical section, for example by enabling interrupts. In the step 219, CPU state saver 210 also switches from system management memory 130 to main memory 120 as necessary. CPU state saver 210 does not flush a cache memory (not shown) in any of the above-described steps. Thereafter, CPU state saver 210 returns to step 214 and awaits another state saving event.

Although certain specific embodiments have been described herein, numerous modifications and adaptations of the described embodiments will be obvious in view of the disclosure.

For example, instead of proactive debugging of error by CPU state saver 210, errors can also be debugged off-line in a development system, for example by use of an inserted emulator (not shown) to load the saved CPU states 130A–130N (FIG. 2) sequentially into the development system. Such sequential loading of CPU states can recreate the error condition by executing the error-causing software, if all of the necessary data is available, for example in CPU states 130A–130N, or can be recreated by a person skilled in the art of designing debugging systems for microprocessors.

In another variation of one embodiment, when an error has not yet been debugged, an error handler in the software being executed adds an erroneous instruction to the known-to-be-erroneous instructions, with the corresponding temporary-fix instruction to gracefully terminate the application, e.g. if the erroneous instruction is known to crash (e.g. "freeze") the CPU. Such graceful termination of an application allows the CPU to continue the execution of other software. Such execution of other software may be valuable to a user, for example by eliminating the need to reboot the operating system that would otherwise have been required in the prior art.

Moreover, any information related to the central processing unit can be saved as a part of the CPU state. For example, if not saved by the above-described save state instruction (Table 1), various CPU registers such as registers CR1, CR2, CR3 and CR4, DR0–DR7 and floating point registers STn, FCS, FSW, FIP, tag word and floating point op code can also be saved as part of the CPU state. The amount of data to be saved in a CPU state is limited only by the size of the system management memory, and the number of saved CPU states required for debugging. If the number of bytes being saved is small, e.g. 228 bytes, several thousand states can be saved in, for example, one MB of system management memory. Alternatively, if several thousands of bytes are saved in a single CPU state (e.g. if data cache is also saved), only a handful of CPU states may be saved in, for example, 32 MB of system management memory.

Numerous such modifications and adaptations of the above described embodiments are encompassed by the attached claims.

We claim:

1. A computer process for identifying an error in a central processing unit (CPU), the computer process comprising:
    executing software in said CPU, wherein the software comprises a plurality of instructions;
    repeatedly interrupting said executing by said CPU, and saving contents of storage elements in said CPU until an error occurs during said executing, said contents saved at each interruption forming one state in a sequence of states of said CPU maintained by said repeatedly saving;
    comparing an instruction in said plurality of instructions with a known-to-be-erroneous instruction prior to execution of said instruction in said plurality of instructions; and
    injecting a fix instruction into the plurality of instructions on finding a match during said comparing, said fix instruction corresponding to the known-to-be-erroneous instruction.

2. The computer process of claim 1 wherein the known-to-be-erroneous instruction is a jump instruction and the fix instruction is a no-op instruction.

3. The computer process of claim 1 wherein the known-to-be-erroneous instruction is a first arithmetic instruction and the fix instruction is a second arithmetic instruction.

4. A computer process for identifying and correcting an error in a central processing unit (CPU), the computer process comprising:

executing software;

repeatedly interrupting said executing and comparing a to-be-executed instruction in the software with a first predetermined instruction; and injecting a second predetermined instruction corresponding to the first predetermined instruction into a plurality of to-be-executed instructions on finding a match during said repeatedly interrupting.

5. The computer process of claim 4 wherein said first instruction is a first arithmetic instruction and said second instruction is a second arithmetic instruction.

6. The computer process of claim 4 wherein:

said first predetermined instruction is known to be erroneous; and said second predetermined instruction implements a fix for said first predetermined instruction.

7. The computer process of claim 6 wherein:

said first instruction causes a crash on execution by said CPU; and said second instruction terminates said executing thereby to avoid said crash.

8. The computer process of claim 6 wherein:

said first instruction causes an error on execution by said CPU; and said second instruction is one of a group of instructions that when executed by said CPU avoid said error.

9. A computer process for identifying and correcting an error, the computer process comprising:

executing software, the software comprising an operating system and at least one application;

repeatedly interrupting said executing and comparing a to-be-executed instruction in the software with a known-to-be-erroneous instruction thereby to detect an upcoming error; and injecting into a plurality of to-be-executed instructions a fix instruction corresponding to the known-to-be-erroneous instruction on finding a match during said comparing, thereby avoiding occurrence of said error.

10. The computer process of claim 9 wherein:

the known-to-be-erroneous instruction is one of a sequence of known-to-be-erroneous instructions; and the fix instruction is one of a sequence of fix instructions corresponding to the sequence of known-to-be-erroneous instructions.

11. The computer process of claim 10 further comprising:

adding to the sequence of known-to-be-erroneous instructions an erroneous instruction; and adding to the sequence of fix instructions an instruction that terminates said executing.

\* \* \* \* \*

UNITED STATES PATENT AND TRADEMARK OFFICE
CERTIFICATE OF CORRECTION

PATENT NO. : 6,202,174 B1
DATED : March 13, 2001
INVENTOR(S) : Lee Sherman; Kyle David G.;

It is certified that error appears in the above-identified patent and that said Letters Patent is hereby corrected as shown below:

Column 1,
Insert "Assignee: Advanced Mico Devices, Inc., Sunnyvale, California"

Signed and Sealed this

Eighteenth Day of December, 2001

*Attest:*

JAMES E. ROGAN
*Attesting Officer*     *Director of the United States Patent and Trademark Office*